C. A. SIBERT.
PIPE BRACKET.
APPLICATION FILED MAY 25, 1908.
930,241. Patented Aug. 3, 1909.
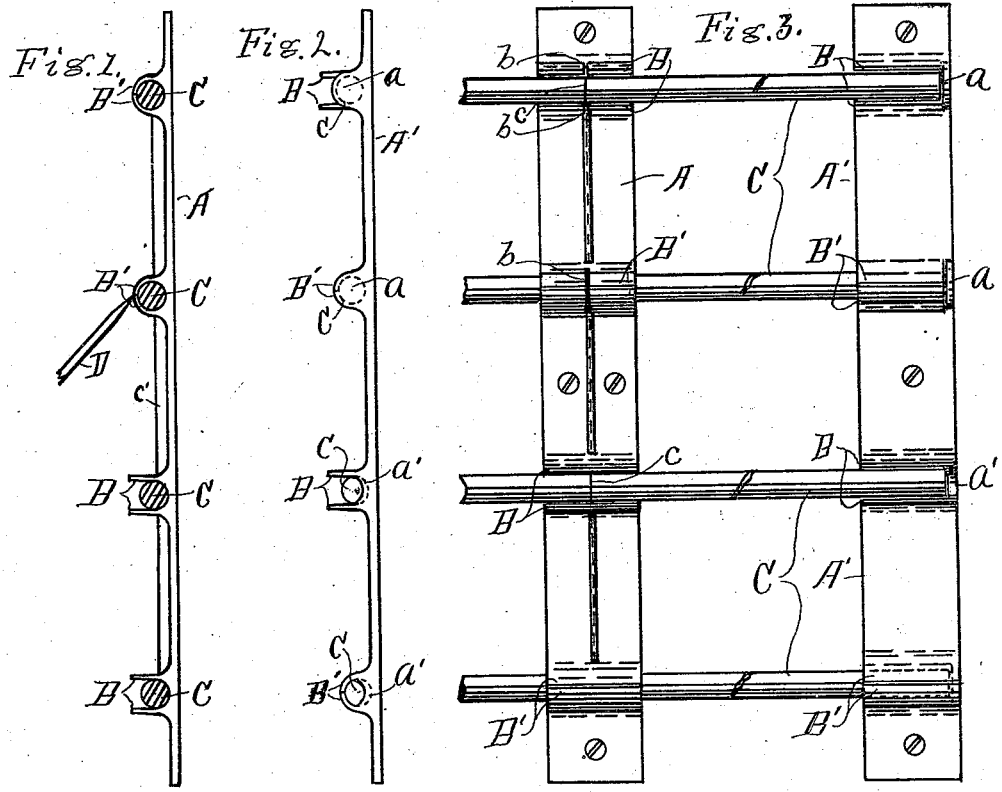
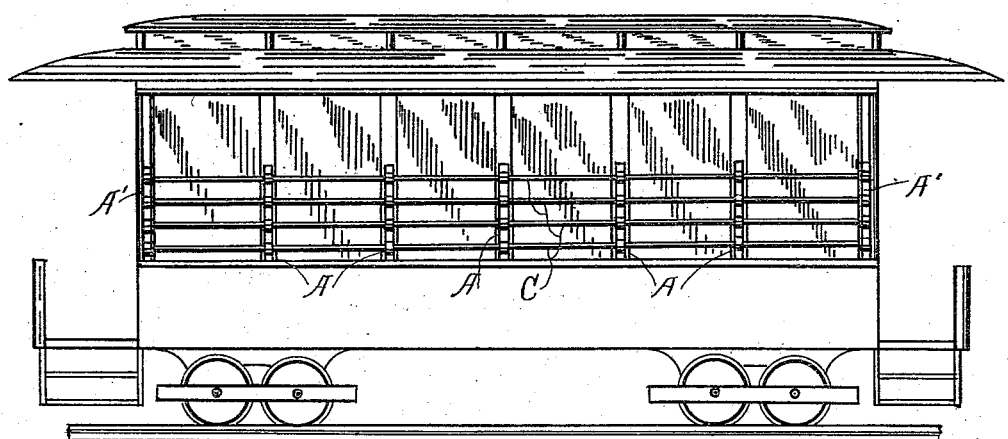
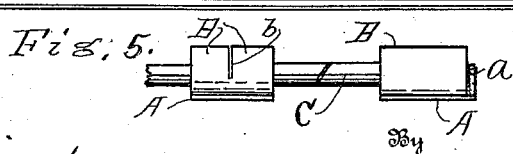
Witnesses
F. G. Friend
A. Allgier
Inventor
Charles A. Sibert
By Ithiel J. Cilley
Attorney

UNITED STATES PATENT OFFICE.

CHARLES A. SIBERT, OF FRUITPORT, MICHIGAN.

PIPE-BRACKET.

No. 930,241.  Specification of Letters Patent.  Patented Aug. 3, 1909.

Application filed May 25, 1908. Serial No. 434,996.

*To all whom it may concern:*

Be it known that I, CHARLES A. SIBERT, a citizen of the United States, residing at Fruitport, in the county of Muskegon and State of Michigan, have invented certain new and useful Improvements in Brackets, of which the following is a specification.

My invention relates to improvements in brackets for securing and supporting piping, rods, &c., and more particularly for securing and supporting window guards upon cars, and especially upon street cars, electrical interurban cars, &c., and its objects are: first, to provide a single piece bracket that will firmly hold several pipes or guard rods. Second, to provide brackets with which pipes or guard rods may be put in sections, to be placed in the desired position at the pleasure of the operator. Third, to provide a bracket with which the rods or pipes may be put up in short sections and readily united in the bracket in such a manner as to entirely hide the line where the several ends meet. Fourth, to provide a means whereby the brackets may be opened to remove the rods from one end of the car without loosening or disfiguring the bracket or rod that leads to the other end of the car, and, fifth, to provide a means for covering and protecting the ends of the rods that are supported at the ends of the car. I attain these objects by the mechanism illustrated in the accompanying drawing, in which—

Figure 1 is a side elevation of the center bracket with part of the rod clamps closed around the pipe or rods and part of them opened in position to receive the rods, and with the rods shown in cross section. Fig. 2 is a like view of the end bracket. Fig. 3 is a front elevation of the same. Fig. 4 is an elevation of a car with the window guards in place, and Fig. 5 is an end view of the brackets showing the center bracket divided so that one rod may be removed without loosening the end of the other.

Similar letters refer to similar parts throughout the several views.

The bracket A must be made of malleable iron, or some other metal or material that may be easily bent around the rods C and will rigidly retain the position around the rods, and from one surface should project wings B B, so formed that a rod placed between them will find a close fitting bed at the base and the outer ends may be drawn around the outer surface of the rod and forced to place so solidly as to absolutely avert the danger of the rods becoming loose in their bearings and rattling with the motion of the car, as shown at B. in Figs. 1, 2 and 3. The center brackets, A, must be made so that the rods or pipes may pass through and project out from both sides, as shown in Figs. 3 and 5, or may be spliced or placed end to end in these brackets to enable the operator to make a long line of guards without showing any break in the rods, as indicated at *c* in Fig. 3, and it is not objectionable to place a strengthening rib or web, *c'*, upon these brackets, and to facilitate the work of splicing the rods in these brackets I find it very advisable to divide the wings B, as at *b* in Figs. 3 and 5, so that the end of one rod may be firmly secured before the other rod is inserted, or one may be released without releasing the other. As it is not necessary to open the wings very far to release the end of a rod I find that the better way to accomplish this is to insert the edge of a cold chisel D, as shown in Fig. 1, in the space between ends of the wings B when closed over the rod, and striking gently against the other end of the chisel until the wing is loosened sufficiently to allow the end of the rod to be easily removed.

The end brackets, A', should be constructed with bearings or projections at the ends of the wings B B', arranged to shield the whole of the end of the rod, as at *a*, or a portion of the end, as at *a'*, so that the rod cannot be made to slide endwise beyond the edge of the bracket, no matter how loose it may become therein.

In Figs. 1, 2, 3 and 5 B represents the wings open in position so that the rods C may be readily inserted, and B', in Figs. 1, 2 and 3, represent the wings closed firmly around the rods C, and in Fig. 4 I have shown the entire guard construction as it is attached to a car for protecting the windows, where the brackets are designed to be secured by screws, as indicated in Figs. 3 and 4, in position so that the rods C C will protect the glass and passengers from injury from flying missiles &c.

In order that these brackets may be made at small cost it is necessary to so form them that they may be cast in single unitary sections, each bracket including the base A or A' and the wings B, which latter must be placed in such a position on the pattern from which the molds are made in which the brackets are cast as will allow them to be readily drawn from the sand molds, and the metal from which they are cast must be of such a nature that the wings may be hammered to place around the rods C, and opened up, several times without danger of breaking the wings off of the base.

What I claim as new, and desire to secure by Letters Patent of the United States, is:

1. In combination with window guard rods, brackets made of flexible metal and having wings curved to form beds for receiving the rods and projecting out at right angles with the face of the bracket a proper distance to fold around the rods with the ends of the wings meeting near the circumferential center of the rods, said wings divided at their longitudinal centers so that each of the adjacent ends of two rods may be secured or released independent of the other rods from moving endwise.

2. In combination with window guard rods, brackets made of flexible metal and having wings made integral therewith and curved to form beds for receiving the rods and projecting out at right angles with the face of the bracket a proper distance to be folded around the rods and meet to form a close joint between them, and end guards made integral with the brackets and uniform in size and shape with the outer surface of the wings when they are folded around the rods.

3. In combination with guard pipes and rods, single piece brackets having wings projecting from one surface, and divided laterally and longitudinally, in position and of a nature to be folded around the rods and firmly secure them.

Signed at Fruitport Michigan May 23 1908.

CHARLES A. SIBERT.

In presence of—
  MARTHA CARLSON,
  GUY L. HUMPHREYS.